US012602373B2

(12) United States Patent (10) Patent No.: US 12,602,373 B2

Fu et al. (45) Date of Patent: Apr. 14, 2026

(54) SYSTEM AND METHOD FOR GENERATING DATABASE QUERIES BASED ON NATURAL LANGUAGE INPUT

(71) Applicant: SHOPEE IP SINGAPORE PRIVATE LIMITED, Singapore (SG)

(72) Inventors: Bin Fu, Singapore (SG); Hao-Tong Ye, Singapore (SG)

(73) Assignee: SHOPEE IP SINGAPORE PRIVATE LIMITED, Singapore (SG)

( * ) Notice: Subject to any disclaimer, the term of this patent is extended or adjusted under 35 U.S.C. 154(b) by 0 days.

(21) Appl. No.: 18/976,323

(22) Filed: Dec. 10, 2024

(65) Prior Publication Data

US 2025/0200027 A1 Jun. 19, 2025

(30) Foreign Application Priority Data

Dec. 19, 2023 (SG) .............................. 10202303571T

(51) Int. Cl.
*G06F 16/242* (2019.01)
*G06F 16/2452* (2019.01)
*G06F 16/3329* (2025.01)

(52) U.S. Cl.
CPC ........ *G06F 16/2423* (2019.01); *G06F 16/242* (2019.01); *G06F 16/24522* (2019.01); *G06F 16/3329* (2019.01)

(58) Field of Classification Search
CPC ............... G06F 16/2423; G06F 16/242; G06F 16/24522; G06F 16/3329

USPC ......................................................... 707/766
See application file for complete search history.

(56) References Cited

U.S. PATENT DOCUMENTS

| 2006/0036430 A1* | 2/2006 | Hu ...................... G10L 15/1822 |
| | | 704/10 |
| 2024/0061832 A1* | 2/2024 | Hoang .............. G06F 16/24522 |
| 2024/0394251 A1* | 11/2024 | Brende ................. G06F 16/243 |

FOREIGN PATENT DOCUMENTS

CN        106528764 B  * 11/2019  ......... G06F 16/3329

OTHER PUBLICATIONS

CN106528764 B English Translation "Method And Device For Searching Based On Question Type Artificial Intelligence Search Words" Xiong Liu et al. Nov. 8, 2019., 2019 (Year: 2019).*

* cited by examiner

*Primary Examiner* — Shahid A Alam
(74) *Attorney, Agent, or Firm* — Straylight LLP

(57) ABSTRACT

Provided herein are systems, methods, and computer-readable media for generating one or more database queries based on a natural language input data. An example method comprises configuring, using a conversational artificial intelligence (AI) editing module, information for a task. Moreover, the method may further comprise parsing the configured information based on a database schema to obtain a parsed database schema. Further, the method may further comprise generating, using a natural language question-answering system, one or more database queries based on the parsed database schema and natural language input data.

20 Claims, 7 Drawing Sheets

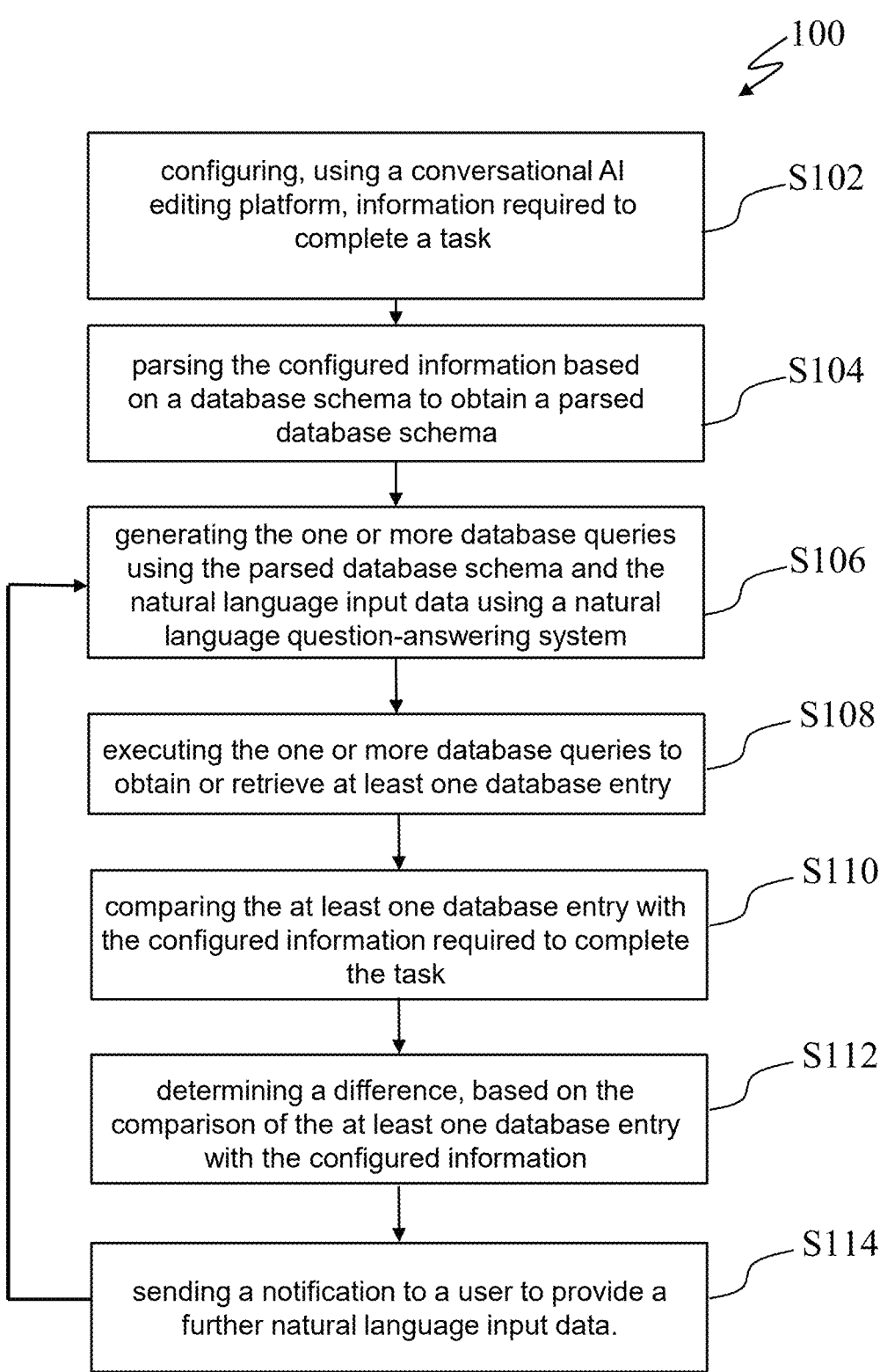

100 configuring, using a conversational AI editing platform, information required to complete a task — S102 parsing the configured information based on a database schema to obtain a parsed database schema — S104 generating the one or more database queries using the parsed database schema and the natural language input data using a natural language question-answering system — S106 executing the one or more database queries to obtain or retrieve at least one database entry — S108 comparing the at least one database entry with the configured information required to complete the task — S110 determining a difference, based on the comparison of the at least one database entry with the configured information — S112 sending a notification to a user to provide a further natural language input data. — S114

SYSTEM AND METHOD FOR GENERATING DATABASE QUERIES BASED ON NATURAL LANGUAGE INPUT

CROSS-REFERENCE TO RELATED APPLICATIONS

This patent application claims the benefit of and priority to Singaporean Non-Provisional patent application Ser. No. 10202303571T, filed with the Intellectual Property Office of Singapore on 19 Dec. 2023, entitled "SYSTEM AND METHOD FOR GENERATING DATABASE QUERIES BASED ON NATURAL LANGUATE INPUT," the contents of which are incorporated by reference in its entirety and for all purposes.

TECHNICAL FIELD

Various aspects of this disclosure relate to systems, and methods for generating database queries based on one or more natural language inputs. The disclosure is particularly suitable for, but not limited to conversational interfaces, such as chatbot systems, and using such chatbot systems to automatically answer questions.

BACKGROUND

The following discussion of the background art is intended to facilitate an understanding of the present disclosure only. It should be appreciated that the discussion is not an acknowledgment or admission that any of the material referred to was published, known, or is part of the common general knowledge of the person skilled in the art in any jurisdiction as of the priority date of the disclosure.

Automated conversation systems, such as chatbot systems, exist to facilitate human users in navigating a website, such as an e-commerce platform. Some automated conversation systems may adopt a combination of a named entity recognition model, a semantic network, such as a knowledge graph, and a fixed dialogue flow, to address a user's chatbot query.

In a conventional chatbot system, a natural language processor (NLP) may convert an input into an intent, the intent is then routed into specific responses in a conversational AI platform, such as a dialogue flow-based platform, that provides additional follow-on prompts or replies depending on the user's intent. It is common that the configuration of information arising from such dialogue flow platform is static, such that once an intent is determined, the chatbot flows to the appropriate static response and provides that response. In other words, conventional chatbot system or automated conversation systems may only produce output in a fixed predefined set and is relatively inflexible.

In addition, current techniques for the generation of dialogue flows may be time-consuming and tedious.

Accordingly, there exists a need to provide a more robust, flexible, and/or efficient chatbot system to improve flexibility.

SUMMARY

Various aspects of the disclosure concern a method, system for generating database queries based on natural language inputs received from a source, such as, but not limited to, natural language inputs received from a user of a chatbot system. In some embodiments, the generated database queries may be used to facilitate an automatic dialogue flow construction, which are to facilitate chatbot conversations. In some embodiments, the automatic dialogue flow construction may be facilitated via a natural language question-answering system, such as a table-based language question-answering system (TableQA). The TableQA system may enhance flexibility when retrieving results from a database in response to a user query, and also take into consideration a database schema of the database used to generate the response, and thus can produce output with relatively less limitation compared to fixed dialogue flow. Based on the retrieved data from the database, a response may be constructed to ask for more information from the user. Repeating the described procedure may automatically form a dialogue flow to achieve a desired objective of the user.

According to an aspect of the disclosure, there is provided a method for generating database queries based on natural language input, the method comprising: configuring, using a conversational AI editing module, information required to complete a task (e.g. a task-oriented dialogue); parsing the configured information based on a database schema to obtain a parsed database schema; and generating one or more database queries using the parsed database schema and the natural language input data using a natural language question-answering system. The conversational AI editing module may be a Dialogflow™ editor. In some embodiments, the configuration of information may include gathering of a plurality of database tables, each of the database tables may correspond with or be associated with a particular schema.

In some embodiments, the natural language question-answering system is a table question-answering (Table QA) system.

In some embodiments, the method comprises retrieving at least one database entry from an associated database based on the one or more database queries.

In some embodiments, the at least one database entry comprises a table, the table having at least one row and at least one column.

In some embodiments, the method further comprises determining, based on the at least one database entry, whether there are multiple possible values in response to the natural language input data based on the table.

In some embodiments, in a positive determination there are multiple possible values in response to the natural language input data, the natural language question-answering system is configured to generate a clarification information in response to the natural language input data.

In some embodiments, the natural language input data comprises at least one of a text-based data and/or an audio data.

In some embodiments, the natural language input data is parsed using a Structured query language (SQL) database schema, and the generated one or more database queries include a SQL query.

In some embodiments, the natural language input data is parsed using a resource description framework schema, and the generated one or more database queries include a SPARQL query.

In some embodiments, the conversational AI editing module comprises a chatbot dialogue flow editing platform.

According to another aspect of the present disclosure there is provided a system for generating one or more database queries based on a natural language input data, the system comprises at least one processor configured to: configure information required to complete a task-oriented dialogue; parse the configured information based on a database schema to obtain a parsed database schema; and generate the one or more database queries using the parsed database schema and the natural language input data using a natural language question-answering system.

In some embodiments, the natural language question-answering system is a table question-answering (Table QA) system.

In some embodiments, the at least one processor is configured to retrieve at least one database entry from an associated database based on the one or more database queries.

In some embodiments, the at least one database entry comprises a table, the table having at least one row and at least one column.

In some embodiments, the at least one processor is configured to determine, based on the at least one database entry, whether there are multiple possible values in response to the natural language input data based on the table.

In some embodiments, in a positive determination there are multiple possible values in response to the natural language input data, the natural language question-answering system is configured to generate a clarification information in response to the natural language input data.

In some embodiments, the natural language input data comprises at least one of a text-based data and/or an audio data.

In some embodiments, the natural language input data is parsed using a Structured query language (SQL) database schema, and the generated one or more database queries include a SQL query.

In some embodiments, the natural language input data is parsed using a resource description framework schema, and the generated one or more database queries include a SPARQL query.

In some embodiments, the at least one processor comprises a chatbot dialogue flow editor module, the chatbot dialogue flow editor module configured to define information required to complete a task-oriented dialogue; a database schema parser module configured to parse the natural language input data based on a database schema to obtain a parsed database schema; and a TableQA module configured to generate the one or more database queries using the parsed database schema and the natural language input data using a natural language question-answering system.

According to another aspect of the present disclosure there is provided a chatbot system, the chatbot system comprises an question-answering module, the question-answering module configured to: configure information required to complete a task-oriented dialogue; parse the configured information based on a database schema to obtain a parsed database schema; generate the one or more database queries using the parsed database schema and the natural language input data using a natural language question-answering system; retrieve at least one database entry from an associated database based on the one or more database queries; and compare the at least one database entry with the information required to complete the task-oriented dialogue.

According to another aspect of the present disclosure there is provided a computer program element comprising program instructions, which, when executed by one or more processors, cause the one or more processors to perform the method as described.

According to another aspect of the present disclosure there is provided a computer-readable medium comprising program instructions, which, when executed by one or more processors, cause the one or more processors to perform the method as described.

It should be noted that embodiments described in context of the method for generating database queries based on natural language input data are analogously valid for the system, and vice versa.

BRIEF DESCRIPTION OF THE DRAWINGS

The invention will be better understood with reference to the detailed description when considered in conjunction with the non-limiting examples and the accompanying drawings, in which:

FIG. 1 is a schematic flow chart depicting a method for generating database queries based on natural language input;

DETAILED DESCRIPTION

Figure 2:
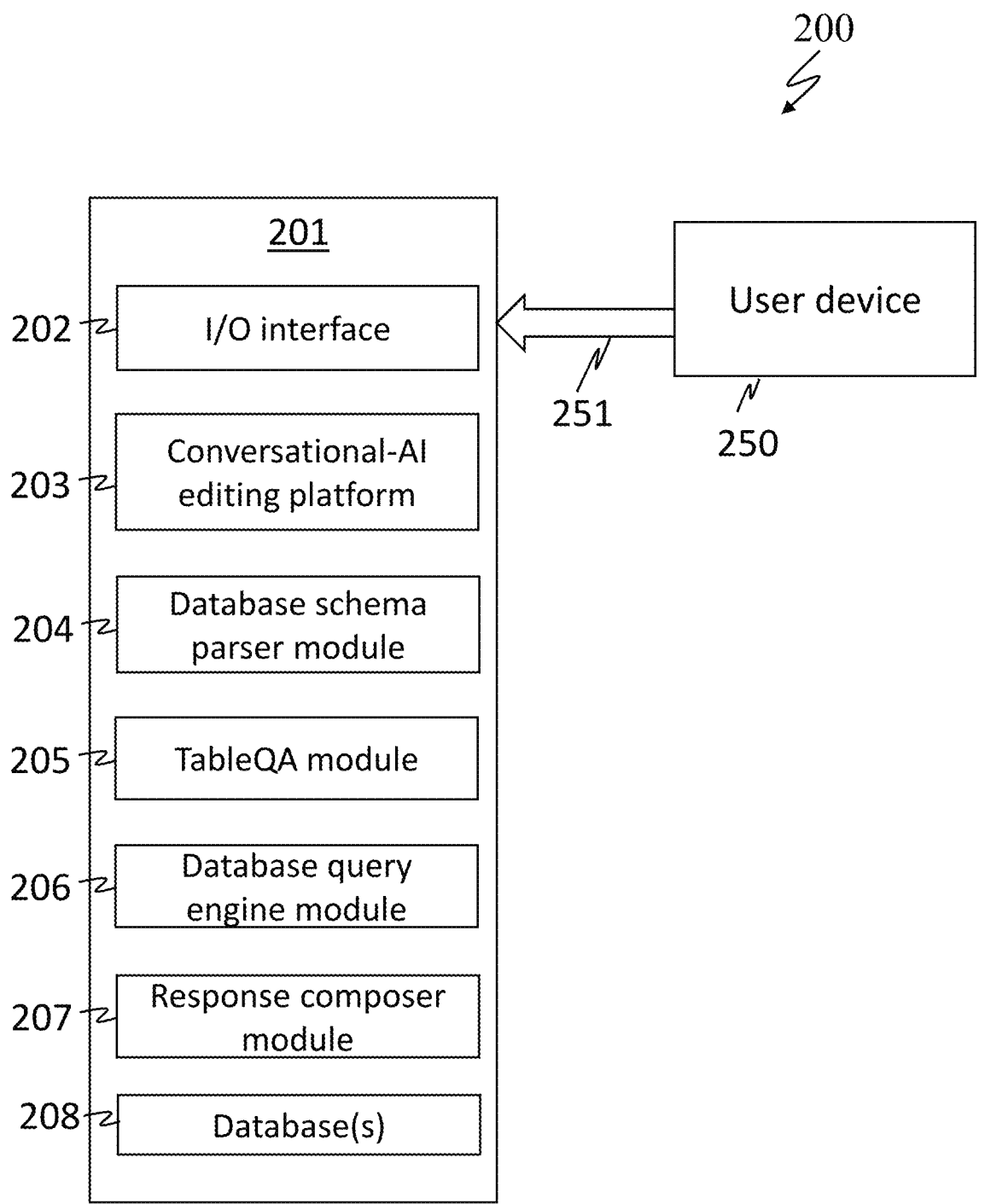
FIG. 2 is a schematic diagram of a system for generating database queries based on natural language input.

The following detailed description refers to the accompanying drawings that show, by way of illustration, specific details and embodiments in which the disclosure may be practiced. These embodiments are described in sufficient detail to enable those skilled in the art to practice the disclosure. Other embodiments may be utilized, and structural and logical changes may be made without departing from the scope of the disclosure. The various embodiments are not necessarily mutually exclusive, as some embodiments can be combined with one or more other embodiments to form new embodiments.

Embodiments described in the context of one of the devices or methods are analogously valid for the other devices or methods. Similarly, embodiments described in the context of a device are analogously valid for a method, and vice-versa.

Features that are described in the context of an embodiment may correspondingly be applicable to the same or similar features in the other embodiments. Features that are described in the context of an embodiment may correspondingly be applicable to the other embodiments, even if not explicitly described in these other embodiments. Furthermore, additions and/or combinations and/or alternatives as described for a feature in the context of an embodiment may correspondingly be applicable to the same or similar feature in the other embodiments.

In the context of various embodiments, the articles "a", "an" and "the" as used with regard to a feature or element include a reference to one or more of the features or elements.

As used herein, the term "and/or" includes any and all combinations of one or more of the associated listed items.

As used herein, the term "chatbot" refers broadly to a computer program or computer-executable instructions to simulate an intelligent conversational interface that enables interactive chat sessions with human users via auditory or textual methods. A chatbot may include one or more virtual agents for intelligent conversations through online platforms for various practical purposes such as customer service and information delivery. Chatbots can include standalone applications or can be integrated with various websites as a platform/tool for providing assistance to users. In some embodiments, the chatbot may provide a conversational experience for interaction with users. For instance, a user can type a question and the chatbot will attempt to interpret it, and then provide an answer. To maximize the relevancy and/or accuracy of the answer, the chatbot may need to be trained on different kinds of inputs received from the users in order to modify the chatbot's responses, which will enhance the customer experience while interacting with the chatbot. In some embodiments, training of a chatbot may include artificial intelligence, such as machine learning algorithms or methods, and such training may further include supervised learning, unsupervised learning, and/or hybrid learning methods. In some embodiments, the machine learning algorithms may include a deep learning algorithm.

As used herein, the term "processor(s)," as used herein, includes one or more electrical circuits capable of processing data, e.g., processing circuits. A processor may include analog circuits or components, digital circuits or components, or hybrid circuits or components. Any other kind of implementation of the respective functions which will be described in more detail below may also be understood as a "circuit" in accordance with an alternative embodiment. A digital circuit may be understood as any kind of a logic implementing entity, which may be special purpose circuitry or a processor executing software stored in a memory, or a firmware.

As used herein, the term "data" may be understood to include information in any suitable analog or digital form, for example, provided as a file, a portion of a file, a set of files, a signal or stream, a portion of a signal or stream, a set of signals or streams, and the like. The term data, however, is not limited to the aforementioned examples and may take some forms and represent any information as understood in the art.

As used herein, the term "intent predict" includes various forms of prediction, including the use of one or more artificial intelligence-based prediction module, for the optimization of one or more objectives. The one or more objectives may include a click-through rate prediction, a resolution prediction, and a category prediction.

As used herein, the term "conversational AI" broadly refers to any platform that can be used to simulate human conversation, and may include natural language processing (NLP) and generative artificial intelligence. An exemplary conversational AI platform may be a dialogue flow platform for a chatbot system, such as Dialogflow™, which is a natural language understanding platform that may be used to facilitate the design and integration of conversational user interface into various chatbot systems. The facilitation of the design and integration may be achieved by means of a dialogue flow editor, such as the Dialogflow™ editor.

As used herein, the term "module" refers to, or forms part of, or include an Application Specific Integrated Circuit (ASIC); an electrical/electronic circuit; a combinational logic circuit; a field programmable gate array (FPGA); a processor (shared, dedicated, or group) that executes code; other suitable hardware components that provide the described functionality; or a combination of some or all of the above, such as in a system-on-chip. The term module may include memory (shared, dedicated, or group) that stores code executed by the processor.

As used herein, the term "natural language question-answering system" broadly includes large language models (LLM), such as, but not limited to, Table question-answering systems and its SQL database query language, and knowledge-graph question answering systems and its SPARQL query language.

As used herein, the term "Table Question Answering (Table QA)" algorithms refer broadly to any algorithms used to provide answers obtained from one or more database tables to answer a user's question(s). Table QA methods may include semantic parsing-based algorithms, which may be further categorized as weakly-supervised table semantic parsing, fully-supervised table parsing, and non-semantic-parsing based methods such as generative methods, extractive methods, matching-based methods, and retriever-reader-based methods.

As used herein, the term "database schema" refers broadly to a structure of a database described in a formal language. The structure may be supported by a database management system, such as a relational database management system (RDBMS). The term "schema" refers to the organization of data as a blueprint of how the database may be constructed. For example, data in relational databases may be divided into database tables. In some embodiments, the database schema may include a set of formulas (sentences) imposed on a database. In a relational database, the database schema may define one or more of the following: tables, fields, relationships, views, indexes, packages, procedures, functions, queues, triggers, types, sequences, materialized views, synonyms, database links, directories, XML schemas, and other elements. Put in another way, the database schema is the structure of the database that defines the objects in the database.

In the following, embodiments will be described in detail.

According to an aspect of the disclosure and with reference to FIG. 1, there is provided a method 100 for generating one or more database queries based on one or more natural language input data, the method comprising the steps of:

Step S102: configuring, using a conversational AI editing platform, information required to complete a task;

Step S104: parsing the configured information based on a database schema to obtain a parsed database schema; and Step S106: generating the one or more database queries using the parsed database schema and the natural language input data using a natural language question-answering system.

In some embodiments, the method 100 may further include the following steps:

Step S108: executing the one or more database queries to obtain or retrieve at least one database entry.

Step S110: comparing the at least one database entry with the configured information required to complete the task.

Step S112: determining a difference, based on the comparison of the at least one database entry with the configured information.

Step S114: sending a notification to a user to provide a further natural language input data (e.g. if the difference exceeds a threshold).

It is appreciable that the steps S106 to S114 may be repeated for the further natural language input data until the task is completed, or until there is no further natural language input data from the user. In other words, the method 100 may be iteratively performed until the user obtains a targeted response/reply, or until the user terminates the human-machine conversation session.

In some embodiments, the step S102 may comprise gathering a plurality of database tables from one or more databases. The gathered database tables may be stored in a configuration information database.

In some embodiments, the step of generating a database query may comprise retrieving, from the configuration information database, one or more tables based on the natural language data input and the parsed configuration information.

In some embodiments, the notification may be sent as a machine-generated or chatbot generated natural language output prompting a user of the chatbot system for more user input. The machine-generated or chatbot generated natural language output may be based on synthesizing the result obtained from the database.

In some embodiments, the method 100 may be implemented as software instructions, the software instructions executable by at least one processor. The software instructions may be stored in a memory, the memory accessible by the at least one processor. In some embodiments, the at least one processor, memory and software instructions may form part of software as a service (SaaS).

In some embodiments, the method 100 may be implemented in a chatbot system of an e-commerce platform.

FIG. 2 shows an embodiment of a system 200 for generating one or more database queries based on natural language input. The system 200 may be, or may form part of, a chatbot system. The system 200 may comprise a processor 201. The processor 201 may be a server computer or part thereof. The server computer may be a single server or comprise a plurality of distributed servers. In some embodiments, the server computer may be a remote server, such as a cloud server.

The processor 201 may include an input and/or output interface 202, a conversational AI editing platform 203, a database schema parser module 204, a TableQA module 205, and a database query engine module 206. In some embodiments, the processor 201 may include a response composer module 207. In some embodiments, the processor 201 may include one or more databases 208 for the retrieval of the database entry in response to the SQL query.

The I/O interface 202 may comprise various hardware and/or software to obtain or receive natural language data 251 from one or more user devices 250. In some embodiments, the I/O interface 202 may include a wired or wireless communication interface to obtain or receive natural language data from one or more sources. In some embodiments, the I/O interface module 202 may be configured to receive the natural language input data from a user, via user device 250. The natural language input data may be in the form of at least one of a text data, an audio data, a video data, and a multimedia data. In some embodiments, non-text data may be converted to text data.

The conversational AI editing module 203 may be configured to define information required to complete a task, for example, a task-oriented dialogue of a chatbot module/system based on the natural language input data 251. In some embodiments, the conversational AI editing module 203 comprises a dialogue flow editor. A user, such as a chatbot operator, can customize and configure the information needed in order to complete a task-oriented dialogue in the dialogue flow editor.

In some embodiments, the configured information may be converted to a suitable form, for example, structured data, that may be used for comparison with a database entry retrieved from the database based on the one or more database queries. In some embodiments, the configuration step may include one or more sub-steps of defining a framework for interaction between the user and a chatbot.

The database schema parser module 204 may be configured to parse the configured information based on a database schema to obtain a parsed database schema. In some embodiments, the database schema may be a Structured query language (SQL) database schema. The parsing may include gathering, from a SQL database, information from multiple different database tables, and producing a format that can be used by the next component. In some embodiments, the database schema parser module 204 may be arranged with data communication with a table retrieval module. The table retrieval module may be configured to gather or retrieve, from the SQL database, tables that is required for the next component. The table retrieval module may be configured to receive input from the configuration information database and the natural language input data.

The natural language question-answer module 205 may be configured to generate the one or more database queries using the parsed database schema output from the database schema parser module 204, and the natural language input data using a natural language question-answering system. In some embodiments, the natural language question-answering system may be based on a table question-answering (TableQA) system. In the TableQA system, the SQL query may be generated based on one or more keywords related to the natural language input data, such keywords may include keywords relating to a location (e.g. a restaurant, a park, a residential housing, a hotel, or any geographical location defined by coordinates), a time (e.g. 2 pm in the afternoon, 0800 hours, from 0900 hours Tuesday to 1200 hours Saturday), an activity (e.g. hotel stay, overseas trip, attending a concert), etc.

The database query engine module 206 may be configured to execute the generated one or more database queries, which may be further configured to retrieve the corresponding replies from at least one table of the database, which may be an SQL database.

The response composer module 207 may be configured to compare the result or the associated entry retrieved from the database with the configuration in the dialogue flow editor. The result or entry may then be used as a feedback to the response composer module 207, which is configured to determine the next action to take, along the dialogue flow, and where applicable, to prompt the user, via a chatbot reply (which may be in natural language), to provide more necessary information where necessary. In some embodiments, the response composer module 207 may be configured to provide the prompt or notification in the form of a machine-generated natural language reply to the user's natural language input data.

In some embodiments, the response composer module 207 may be configured to determine a difference, and based on the difference, the response composer module 207 may then be configured to revise or suggest a revision of the information required to complete the task-oriented dialogue based on the difference.

In some embodiments, the TableQA module 205 may parse the natural language input data using a Structured query language (SQL) database schema. The generated one or more database queries may therefore include one or more SQL queries.

In some embodiments, the database query engine module 206 may be configured to analyze the structure of the generated one or more SQL queries, the generated one or more SQL queries including one or more SQL statements. For example, the one or more SQL statements may be decompose into its elements, for example, tables, columns, joins, filters, subqueries, etc. The SQL query may be decompose based on the SQL syntax, identifies each of the query components, and then creates an Abstract Syntax Tree (AST) in a hierarchical format.

In some embodiments, the database schema parser module 204 may include an online SQL parser. The online SQL parser may follow a Software as a Service (SaaS) model.

It is appreciable that the system 200 of the present disclosure may be configured to produce a structured intermediate representation of a user's intent with an SQL query. The user's intent may then be compared with the configuration (i.e. configured information) in the dialogue flow editor. Based on the difference, the system can then automatically continue the dialogue flow to finish the final task. The automation may be achieved in part by the response composer module 207.

Figure 3A:
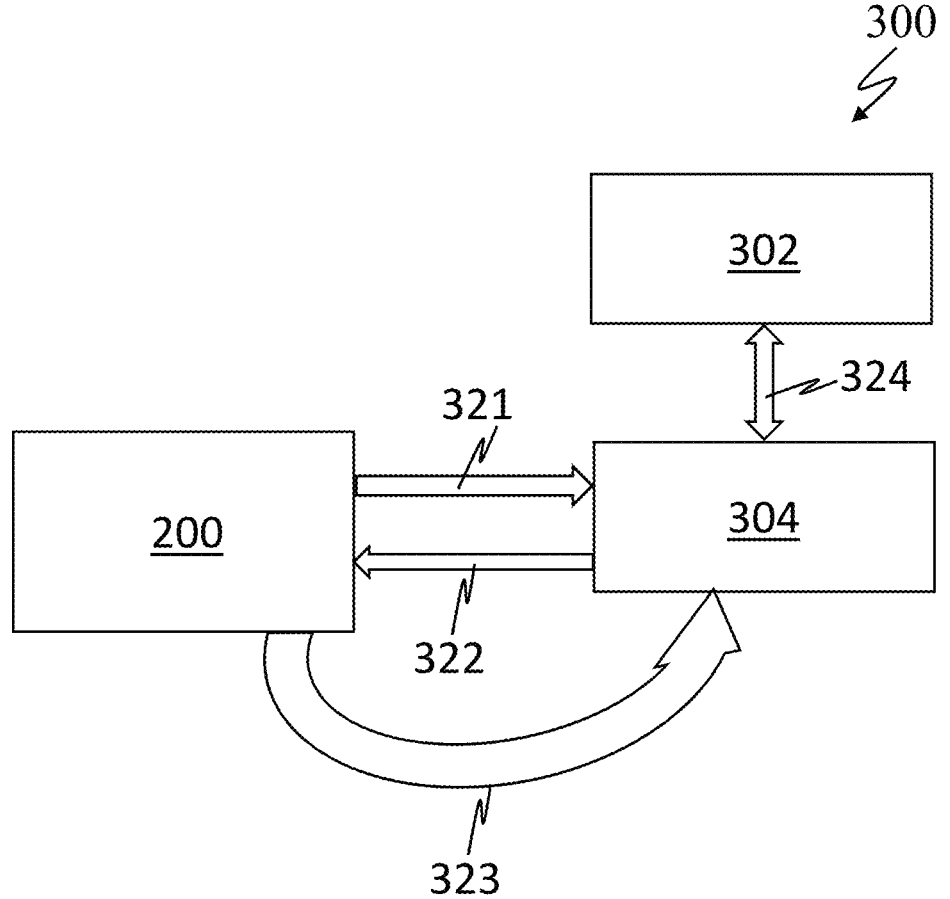
FIG. 3A is a schematic diagram of the data connection between the system and one or more other modules of a chatbot system.

FIG. 3A shows an embodiment of the system 200 applied to a chatbot system 300. The chatbot system may comprise a front end 302 for a user to interact and access the chatbot system 300. The front end 302 may be linked to a backend 304. The backend 304 may be configured to send data to the system 200 and receive data from the system 200. The backend 304 may comprise the conversational AI editing platform, such as a dialogue flow editor.

Figure 3B:
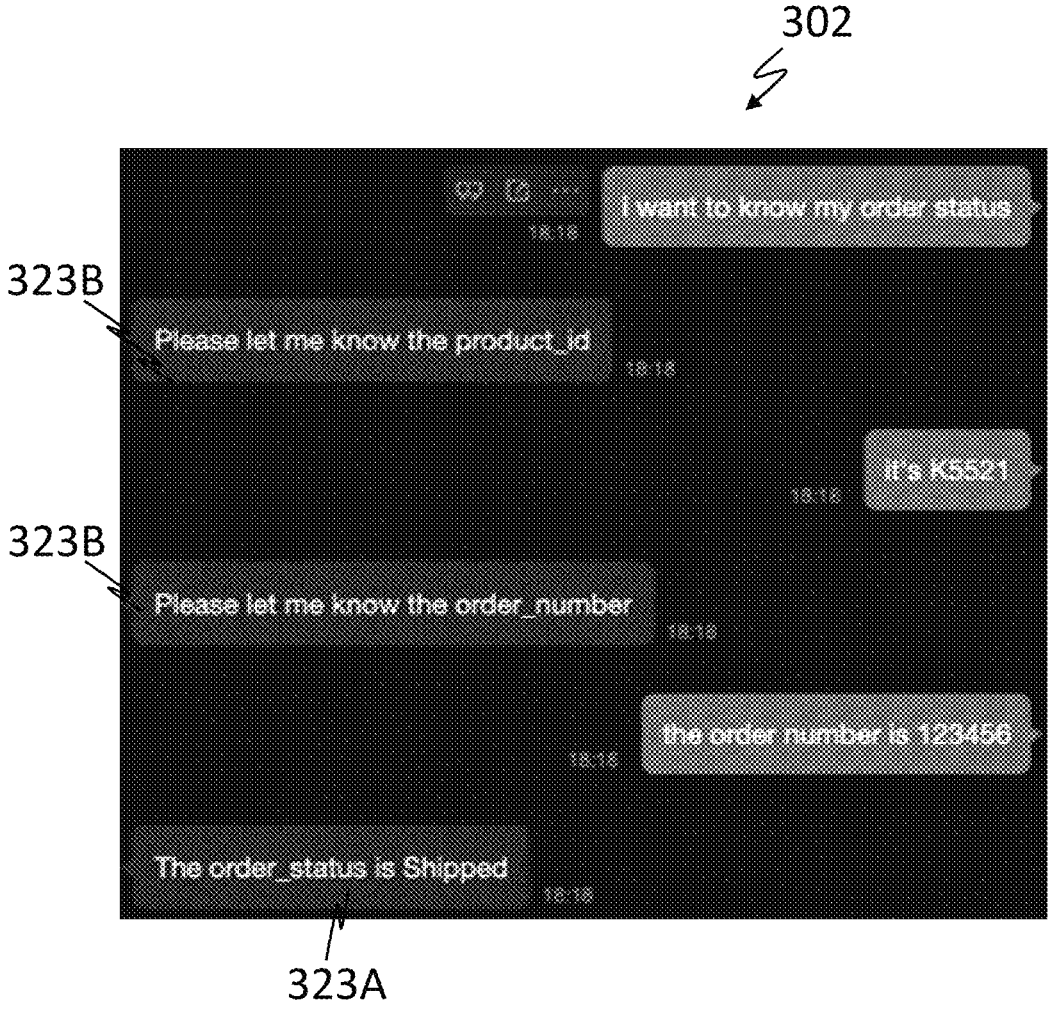
FIG. 3B shows an illustration of a final reply and intermediate reply, in the form of a request for more information, from a user.

In an exemplary operation, the system 200 may interface with the backend 304 to send a request for comparison data 321 of the response composer module 207 to the dialogue flow editor. The backend 304 may reply with the configured information 322 (table information) for the determination of any differences with the retrieved database reply. The response composer module 207 may then send further data comprising a response 323 based on the configured information 322 by the backend 304. The backend 304 may be configured to send a notification 324 in the form of a natural language sentence to the front end 302 to prompt the user to provide more information. In some embodiments, as shown in FIG. 3B, the response 323 may be a final result/response 323A replying to the query generated by the user via the front end 302. The result 323A may be an answer to the user's query, this may be a follow-up of one or more the response 323 in the form of clarification information 323B used for prompting the user to provide more information.

In some embodiments, one or more TableQA nodes may be used to create the table that lists the values associated with the question-answer system. Such an arrangement may make it relatively easy to inspect the data values or export them in an easily readable form.

Figure 4:
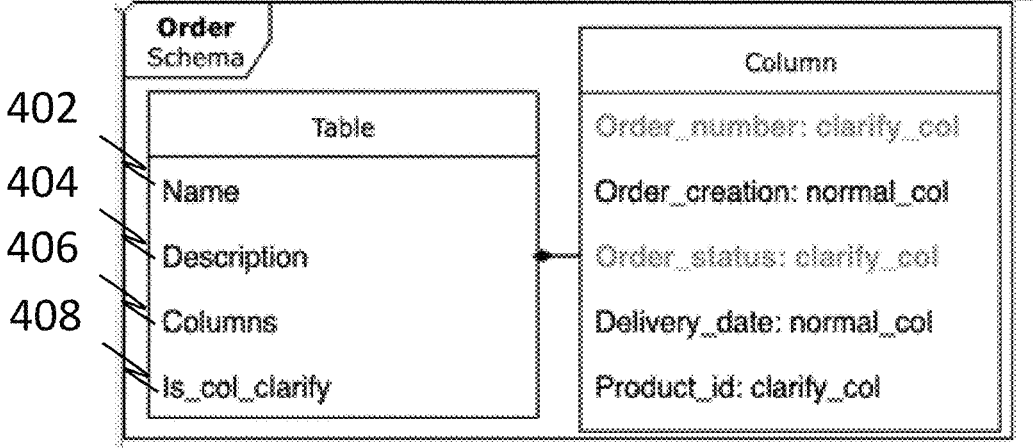
FIG. 4 is a schematic diagram of a table retrieval module configured to gather or retrieve one or more tables before a parsing of the database schema.

FIG. 4 shows an example of a database schema, in the form of a transaction or order schema associated with transaction or order data for a particular user account. The order schema comprises a table having a name data field 402, a description data field 404, a columns data field 406, and a Is_col_clarify field 408. The columns data field 406 of the table may include an order_number: clarify_col, a order_creation: normal_col, an order_status: clarify_col, a delivery_date: normal_col, and a product_Id: clarify_col.

In some embodiments, the configuration using a conversational AI editing module, information required to complete a task based on the natural language input data, will involve parsing the configured information based on a database schema to obtain a parsed database schema. The dialogue flow, which includes multiple nodes (hereinafter referred to as TableQA nodes), may be configured on the task flow editor (conversational AI platform). The created TableQA node to construct TableQA dialogue flow for structure knowledge may involve only one dialogue flow required for all gathered tables, such that one simple dialogue flow on the dialogue flow editor, such as a text flow editor, and other dialogue flow of each table or property will be generated automatically based on the TableQA and user's query.

Figure 5:
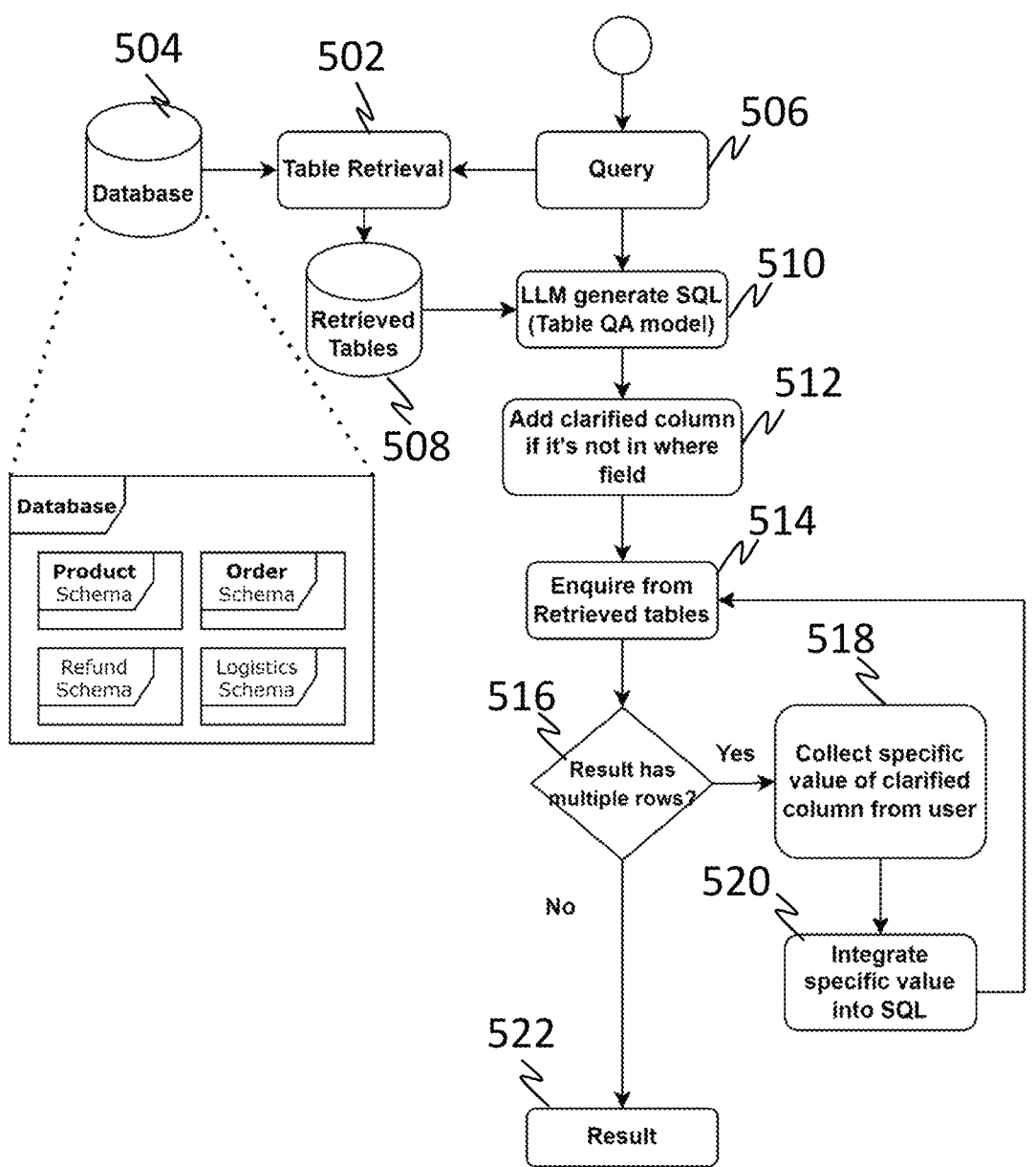
FIG. 5 and FIG. 6 are schematic diagrams illustrating a pipeline of a large language model, in the form of TableQA nodes, according to some embodiments.

FIG. 5 shows an example of a pipeline or logic flow of a large language model (LLM), in the form of TableQA nodes, used in some embodiments of the present disclosure. As part of the generation of a database query, a table retrieval module 502 may be used to gather the configured information from an SQL database 504 which was already configured and parsed based on a query (i.e. a natural language input data) 506 received from a user. The retrieved tables 508 may be stored temporarily in a cache and used by the natural language question-answering system to generate the SQL query 510 and the natural language input data 506 using the TableQA nodes structure as described. Based on the generated SQL query 510, a clarified column 512 may be added if it is not in the "where" field 408 of the table.

The TableQA node may next be further configured to retrieve at least one database entry 514 from the retrieved tables based on query 510. The retrieved entry 514 may be a table entry of a particular schema.

Flow elements 514 to 520 describe an iterative flow to determine an output result to the natural language input data (i.e. the query). Broadly, the table entry is parsed to determine whether multiple results are possible, as such multiple results may provide an indication that the natural language input data is not specific enough for the TableQA node to generate a definite answer. This may be based on a determination of whether there is more than one row or more than one column in the retrieved table entry. In a positive determination that there are multiple possible results, a intermediate reply, in the form of a request for more information, is generated by the TableQA node to prompt the user so as to reduce the multiple results to an eventual one result (i.e. the final result).

Referring to FIG. 5, based on the retrieved table 514, the TableQA node determines whether the result may be associated with more than one row 516, i.e. in the case of multiple rows. In a positive determination (i.e. "yes"), this indicates that the query may not be specific enough for the Table QA to return a final answer 323A (see FIG. 3B). In this case, the TableQA prompts the chatbot interface to collect further information 518 from the user. The request for further information 518 may include displaying the clarification information 323B (see FIG. 3B) to the user for further action. One or more data associated with the parsed clarification information 323B may be integrated into the SQL database. The TableQA may then loop back to enquire from the retrieved table 514 and the process continues until a final result/answer 323A is obtained.

Figure 6:
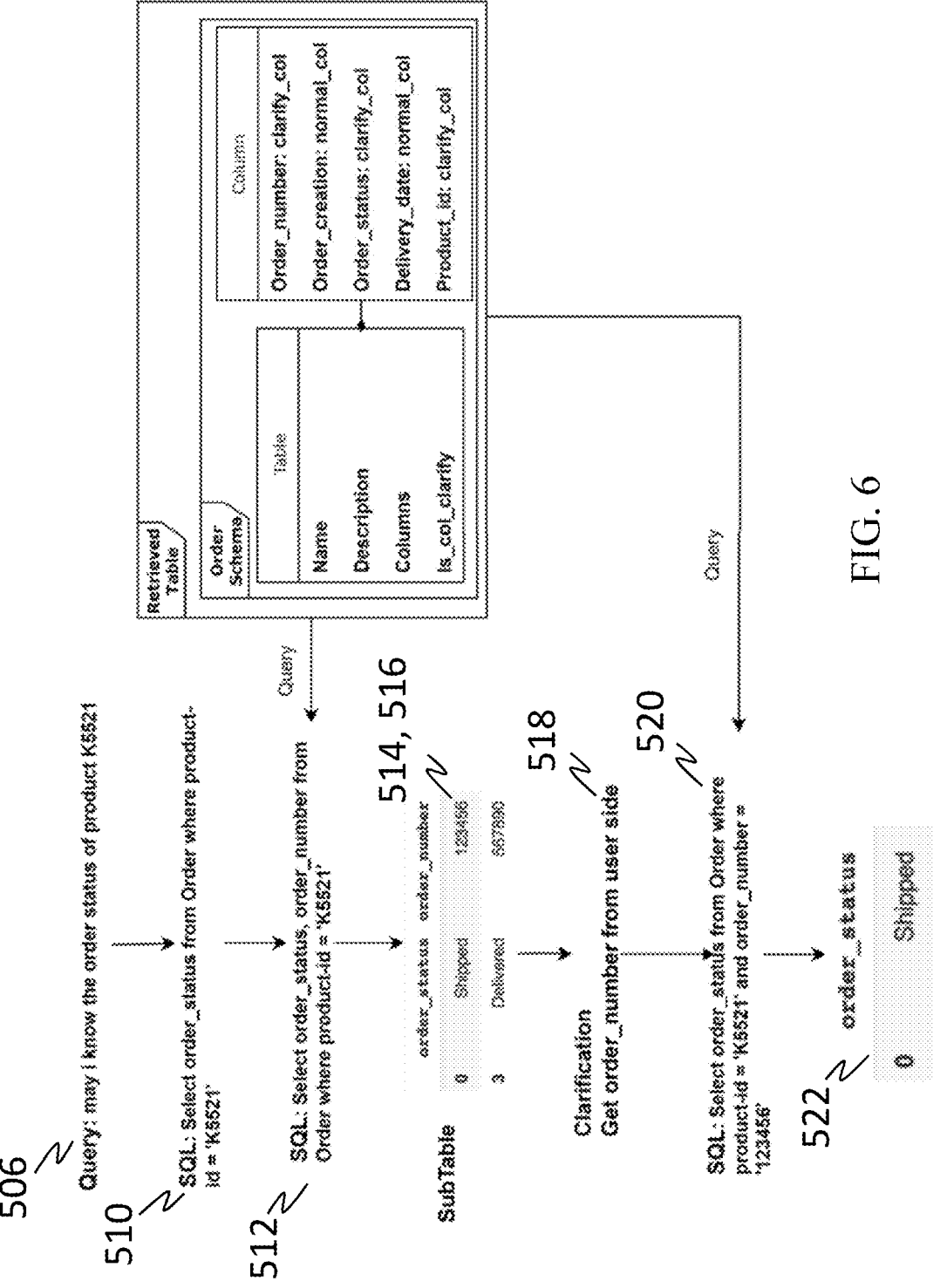

FIG. 6 shows an illustration of a generated backend TableQA node upon receiving a query 506 from a user from a chatbot front end 302 (see also FIG. 3). FIG. 6 may be correlated to various elements or flow as depicted in FIG. 5, and is labelled as such.

In FIG. 6, a query 506 is received in the form of a natural language input text keyed in by a user of a chatbot "may I know the order status of product K5521".

The query is then received by the backend TableQA node and relevant tables associated with the "order schema" is retrieved.

The query is parsed by the TableQA node to generate a database query based on the SQL syntax "Select order_status from Order where product_id=K5521" (510)

As illustrated by FIG. 6, the retrieved sub-table 514 comprises more than one row 516, in this case, two rows 516. This may imply that the user has multiple orders associated with the product K5521. One of the rows indicates a "order_status shipped" associated with order_number 123456, and the other row indicates a "order status delivered" associated with order_number 567890.

Based on the decision box 516, there is a need to obtain clarification from the user. To generate the natural language text reply (i.e. clarification information 323B), a specific value of the column where clarification from the chatbot user is required may be obtained. In this case, the multiple rows are due to the inability to determine the order number. Hence the "order_number" parameter is obtained and used to generate a natural language text in the form of "Please let me know the order_number" clarification.

Upon receipt of the answer, in the form of another natural language input data 518, from the user, for example "123456", the reply is parsed and integrated 520 to form another SQL query "Select order_status from Order where product_id="K5521" and order_number="123456".

Based on the above, the SQL query generated, the order-_status, in the form of "shipped" 522, may be generated as a natural language output to the user.

Although the illustration depicts two rows with two columns, it may be appreciable that multiple rows associated with more than two columns may be generated. In such cases, the TableQA node may be configured to generate further clarifications based on the multiple columns.

The system and method of the present disclosure provides a dynamic update of a dialogue flow editor based on real-time processing of a user natural language input data. Instead of using static responses, the NLP input may instead converted into a database query, and the query provides a formatted dynamic response instead of a static response. The interface with a dialogue flow editor allows a user to adjust the dialogue flow based not only on the intent and entities from the user query, but from the data reported from the database. In some embodiments, when a chatbot receives natural language input from a user, the input is translated into a database query. In some embodiments, a database query engine executes the database query to retrieve data from a database. In some embodiments, a chatbot response composer compares the data retrieved from the database with flow configurations generated by the dialogue flow editor to determine a response for the user, so that the result is not merely displayed but is instead used as an input to determine the further dialogue flow path.

Although the various embodiments have been described with reference to TableQA as an example of the question answering system, it is contemplated that other question answering system may be used without departing from the scope of the present disclosure. In some embodiments, the question answering system may be in the form of a knowl-edge-graph question answering system having database in a resource description framework format, which can be que-ried using the SPARQL query language.

It is appreciable that the natural language input data, the one or more database queries, and may include real time data and offline data.

The methods described herein may be performed and the various processing or computation units and the devices and computing entities described herein may be implemented by one or more circuits. In an embodiment, a "circuit" may be understood as any kind of a logic implementing entity, which may be hardware, software, firmware, or any com-bination thereof. Thus, in an embodiment, a "circuit" may be a hard-wired logic circuit or a programmable logic circuit such as a programmable processor, e.g. a microprocessor. A "circuit" may also be software being implemented or executed by a processor, e.g. any kind of computer program, e.g. a computer program using a virtual machine code. Any other kind of implementation of the respective functions which are described herein may also be understood as a "circuit" in accordance with an alternative embodiment.

While the disclosure has been particularly shown and described with reference to specific embodiments, it should be understood by those skilled in the art that various changes in form and detail may be made therein without departing from the spirit and scope of the invention as defined by the appended claims. The scope of the invention is thus indi-cated by the appended claims and all changes which come within the meaning and range of equivalency of the claims are therefore intended to be embraced.

Illustrative examples of the disclosure include:

Aspect 1. A method for generating one or more database queries based on a natural language input data, the method comprising: configuring, using a conversational AI editing module, information required to complete a task; parsing the configured information based on a database schema to obtain a parsed database schema; and generating the one or more database queries using the parsed database schema and the natural language input data using a natural language question-answering system.

Aspect 2. The method of Aspect 1, wherein the natural language question-answering system is a table question-answering (TableQA) system or a knowledge-graph ques-tion-answering system.

Aspect 3. The method of Aspects 1 or 2, further compris-ing retrieving at least one database entry from an associated database based on the one or more database queries.

Aspect 4. The method of Aspect 3, wherein the at least one database entry comprises a table, the table having at least one row and at least one column.

Aspect 5. The method of Aspect 4, further comprising determining, based on the at least one database entry, whether there are multiple possible values in response to the natural language input data based on the table.

Aspect 6. The method of Aspect 5, wherein in a positive determination there are multiple possible values in response to the natural language input data, the natural language question-answering system is configured to generate a clari-fication information in response to the natural language input data.

Aspect 7. The method of any of Aspects 1 to 6, wherein the natural language input data comprises at least one of a text-based data and/or an audio data.

Aspect 8. The method of any of Aspects 1 to 7, wherein the natural language input data is parsed using a Structured query language (SQL) database schema, and the generated one or more database queries include a SQL query.

Aspect 9. The method of any one of Aspects 1 to 7, wherein the natural language input data is parsed using a resource description framework schema, and the generated one or more database queries include a SPARQL query.

Aspect 10. The method of any of Aspects 1 to 9, wherein the conversational AI editing module comprises a chatbot dialogue flow editing platform.

Aspect 11. A system for generating one or more database queries based on a natural language input data, the system comprises at least one processor configured to: configure information required to complete a task-oriented dialogue; parse the configured information based on a database schema to obtain a parsed database schema; and generate the one or more database queries using the parsed database schema and the natural language input data using a natural language question-answering system.

Aspect 12. The system of Aspect 11, wherein the natural language question-answering system is a table question-answering (Table QA) system or a knowledge-graph question-answering system.

Aspect 13. The system of Aspects 11 or 12, wherein the at least one processor is configured to retrieve at least one database entry from an associated database based on the one or more database queries.

Aspect 14. The system of Aspect 13, wherein the at least one database entry comprises a table, the table having at least one row and at least one column.

Aspect 15. The system of Aspect 14, wherein the at least one processor is configured to determine, based on the at least one database entry, whether there are multiple possible values in response to the natural language input data based on the table.

Aspect 16. The system of Aspect 15, wherein in a positive determination there are multiple possible values in response to the natural language input data, the natural language question-answering system is configured to generate a clarification information in response to the natural language input data.

Aspect 17. The system of any of Aspects 11 to 16, wherein the natural language input data comprises at least one of a text-based data and/or an audio data.

Aspect 18. The system of any of Aspects 11 to 17, wherein the natural language input data is parsed using a Structured query language (SQL) database schema, and the generated one or more database queries include a SQL query.

Aspect 19. The system of any of Aspects 11 to 17, wherein the natural language input data is parsed using a resource description framework schema, and the generated one or more database queries include a SPARQL query.

Aspect 20. The system of any of Aspects 11 to 19, wherein the at least one processor comprises a chatbot dialogue flow editor module, the chatbot dialogue flow editor module configured to define information required to complete a task-oriented dialogue based on the natural language input data; a database schema parser module configured to parse the natural language input data based on a database schema to obtain a parsed database schema; and a TableQA module configured to generate the one or more database queries using the parsed database schema and the natural language input data using a natural language question-answering system.

Aspect 21. A chatbot system, the chatbot system comprises a question-answering module, the question-answering module configured to: configure information required to complete a task-oriented dialogue; parse the configured information based on a database schema to obtain a parsed database schema; generate the one or more database queries using the parsed database schema and the natural language input data using a natural language question-answering system; retrieve at least one database entry from an associated database based on the one or more database queries; and compare the at least one database entry with the information required to complete the task-oriented dialogue.

Aspect 22. A computer program element comprising program instructions, which, when executed by one or more processors, cause the one or more processors to perform the method of any of Aspects 1 to 10.

Aspect 23. A computer-readable medium comprising program instructions, which, when executed by one or more processors, cause the one or more processors to perform the method of any of Aspects 1 to 9.

What is claimed is:

1. A method for generating one or more database queries based on natural language input data, the method comprising:

configuring, using a conversational artificial intelligence (AI) editing module, information for completing a task-oriented dialogue based on natural language input data;

parsing the configured information based on a database schema;

generating a parsed database schema based on the parsed configured information;

generating, using a natural language question-answering system, one or more database queries based on the parsed database schema and the natural language input data;

obtaining at least one database entry from one or more databases by executing the one or more database queries;

comparing the at least one database entry with the configured information; and generating a clarification prompt based on the comparison.

2. The method of claim 1, wherein the natural language question-answering system is a table question-answering (TableQA) system or a knowledge-graph question-answering system.

3. The method of claim 1, wherein the at least one database entry comprises a table, the table having at least one row and at least one column.

4. The method of claim 3, further comprising:

determining whether there are multiple possible values based on the natural language input data and the table of the at least one database entry.

5. The method of claim 4, further comprising:

determining there are multiple possible values; and generating, using the natural language question-answering system, a clarification information based on the natural language input data.

6. The method of claim 1, wherein the natural language input data comprises at least one of a text-based data, an audio data, or any combination thereof.

7. The method of claim 1, wherein the database schema is Structured Query Language (SQL) database schema and the one or more database queries includes a SQL query.

8. The method of claim 1, further comprising:

parsing, using a resource description framework schema, the natural language input data, wherein the generated one or more database queries includes a SPARQL query.

9. The method of claim 1, wherein the conversational AI editing module comprises a chatbot dialogue flow editor module.

10. The method of claim 1, wherein generating the clarification prompt comprises:

revising the configured information, wherein the clarification prompt is based on the revised configured information.

11. A system for generating one or more database queries based on natural language input data, the system comprises:

at least one memory storing instruction; and at least one processor coupled to the at least one memory, the at least one processor is configured to execute the instructions to:

configure information for completing a task-oriented dialogue based on natural language input data;

parse the configured information based on a database schema;

generate a parsed database schema based on the parsed configured information;

generate, using a natural language question-answering system, one or more database queries based on the parsed database schema and the natural language input data;

obtain at least one database entry from one or more databases by executing the one or more database queries;

compare the at least one database entry with the configured information; and generate a clarification prompt based on the comparison.

12. The system of claim 11, wherein the natural language question-answering system is a table question-answering (Table QA) system or a knowledge-graph question-answering system.

13. The system of claim 11, wherein the at least one database entry comprises a table, the table having at least one row and at least one column.

14. The system of claim 13, wherein the at least one processor is further configured to execute the instructions to:

determine whether there are multiple possible values based on the natural language input data and the table of the at least one database entry.

15. The system of claim 14, wherein the at least one processor is further configured to execute the instructions to:

determine there are multiple possible values; and generate, using the natural language question-answering system, a clarification information in response to the natural language input data.

16. The system of claim 14, wherein the natural language input data comprises a text-based data, an audio data, or any combination thereof.

17. The system of claim 14, wherein the database schema is Structured Query Language (SQL) database schema and the one or more database queries include a SQL query.

18. The system of claim 14, wherein the at least one processor is further configured to execute the instructions to:

parse, using a resource description framework schema, the natural language input data, wherein the generated one or more database queries include a SPARQL query.

19. The system of claim 14, wherein to generate the clarification prompt, the at least one processor is further configured to execute the instructions to:

revise the configured information, wherein the clarification prompt is based on the revised configured information.

20. A non-transitory computer-readable medium comprising program instructions, which, when executed by one or more processors, cause the one or more processors to perform operations comprising:

configuring information for completing a task-oriented dialogue based on natural language input data;

parsing the configured information based on a database schema;

generating a parsed database schema based on the parsed configured information;

generating, using a natural language question-answering system, one or more database queries based on the parsed database schema and the natural language input data;

retrieving, from an associated database, at least one database entry by executing the one or more database queries;

comparing the at least one database entry with the information for the task-oriented dialogue; and generating a clarification prompt based on the comparison.

\*   \*   \*   \*   \*